United States Patent [19]

Berg

[11] 4,300,247
[45] Nov. 17, 1981

[54] ENERGY CONSERVATION IN SHOWER BATHING

[76] Inventor: Charles A. Berg, R.F.D. 1, Box 165, Buckfield, Me. 04220

[21] Appl. No.: 147,372

[22] Filed: May 7, 1980

[51] Int. Cl.³ ............................................. A47K 3/22
[52] U.S. Cl. ......................................... 4/598; 4/493; 4/596; 165/66; 219/305
[58] Field of Search ................... 4/598, 597, 524, 493, 4/596; 219/305; 62/181; 165/66

[56] References Cited

U.S. PATENT DOCUMENTS

| | | | |
|---|---|---|---|
| 1,899,839 | 2/1933 | Von Ruden | 219/305 |
| 2,492,913 | 12/1949 | Bailey | 4/598 |
| 2,575,325 | 11/1951 | Ambrose et al. | 62/181 |
| 2,653,013 | 9/1953 | Freer | 165/66 |
| 3,263,242 | 8/1966 | Will | 4/598 |
| 3,361,194 | 1/1968 | Cowlin | 165/66 |
| 3,521,703 | 7/1970 | Koziara | 165/66 |
| 3,594,063 | 7/1971 | Smillie | 4/597 X |

FOREIGN PATENT DOCUMENTS

| | | |
|---|---|---|
| 2447428 | 4/1975 | Fed. Rep. of Germany . |
| 2304537 | 8/1975 | Fed. Rep. of Germany . |
| 2502351 | 7/1976 | Fed. Rep. of Germany .......... 4/598 |
| 2550320 | 5/1977 | Fed. Rep. of Germany . |
| 11426 | 12/1976 | France . |
| 4445 | 9/1978 | France . |

Primary Examiner—Henry K. Artis

[57] ABSTRACT

Disclosed is a method and apparatus for decreasing the energy consumed by shower baths. The apparatus comprises a heat exchanger used to preheat incoming cold water with hot drain water and a local hot water heater used to elevate the temperature of the hot water feed to levels above about 170° F. The local heater and heat exchanger cooperate to result in energy savings of approximately 50% or more.

22 Claims, 4 Drawing Figures

ENERGY CONSERVATION IN SHOWER BATHING

BACKGROUND OF THE INVENTION

This invention relates to a method and apparatus for conserving energy in appliances which utilize a flow of hot water for cleaning purposes such as shower baths.

It has been reported that approximately 4 percent of the total national consumption of fuel in the United States is used to heat hot water in commercial and residential buildings. Of this amount, approximately one-fourth, or 1 percent of the total is used to heat bath water, mostly for shower bathing purposes. At the present rate of consumption of fuels in the United States, approximately $80 \times 10^{15}$ BTU per year, shower bathing in residences may consume approximately $0.8 \times 10^{15}$ BTU: the equivalent of about 1.6 hundred million barrels of oil per year. Thus, the conservation of energy in shower bathing is of large potential significance.

Conventional shower baths comprise a bathing compartment fitted with a nozzle, a mixing valve, and a drain. Hot water, typically from a central boiler installed in the building in which the shower bath is located, and cold water are fed into the mixing valve and are there combined to form a stream of water which exits the nozzle at a selected bath water temperature intermediate that of the cold and hot water inputs. In an open shower stall, a substantial fraction of the heat contained in the bath water exiting the nozzle will be lost by ongoing evaporation with the result that the water entering the drain will be at a lower temperature. However, in an enclosed bathing compartment equipped with a shower door, the interior of the compartment quickly becomes saturated with water vapor. This results in a drain water temperature substantially equal to the temperature of the water exiting the nozzle.

From the foregoing it is apparent that a certain amount of energy could be conserved in shower bathing if the warmed drain water could be passed in heat exchange relation with cold water. This would result in a warmer cold water input, and less hot water would be needed to attain a selected bathing water temperature. This broad concept is known to the art as evidenced, for example, by West German Offenlegungsschrift No. 24 47 428 (Apr. 17, 1975).

SUMMARY OF THE INVENTION

In its broadest aspects, the instant invention comprises a heat exchanger for use in apparatus for bathing comprising a bathing enclosure having a base, a nozzle for passing bathing water through the enclosure, a mixing valve having a hot water inlet, cold water inlet, and bathing water outlet in communication with the nozzle, and a drain in the base. The heat exchanger has a flow-through drain water compartment in communication with the drain, a drain water outlet below the level of the drain but above at least a substantial portion of the volume of the drain water flow through compartment, and a flow-through cold water compartment in communication with the cold water inlet of the mixing valve. The heat exchanger is operable to cool the drain water passing through the drain water compartment of the heat exchanger and to heat the cold water passing therethrough, thereby substantially decreasing the net quantity of heat necessary to maintain a selected bathing water temperature.

Preferably, the apparatus of the invention further comprises a local hot water heater adjacent said enclosure (as opposed to a central boiler) which is in communication with the hot water input of the mixing valve. The heater comprises a heating element disposed within means defining a feed water flow path and is capable of continuously providing water at a temperature of at least about 170° F. to the mixing valve so that the ratio of hot water to cold water entering the mixing valve to attain a select bath water temperature is no greater than about 1 to 1.

Contrary to intuition, the inclusion of such a local hot water heater in combination with a heat exchanger of the type described above can result in a quite significant net savings in the energy input required to maintain a selected bath water temperature. The mechanism of this energy saving is as follows. By boosting the temperature of hot water entering the mixing valve, the fraction of the flow of bathing water exiting the nozzle which comes from the cold water input is larger, that is, more cold water is mixed with the hot in order to obtain a selected bath water temperature. This means that there is a greater volume of cold water available to absorb drain water waste heat, and that the overall efficiency of the heat exchange between incoming cold water and exiting drain water is increased. As will be explained in detail below, the combination of a heat exchanger and a local heater used either to boost the temperature of hot water fed from a central boiler or to provide the entire thermal input for the shower bath can result in a 50 percent or greater energy savings.

In preferred embodiments, the heat exchanger contains a second drain water outlet located below the level of the drain water compartment and means for diverting drain water flow to a selected one of the drain water outlets. This feature enables the user to fill the heat exchanger with hot drain water while the shower is in use and to empty the heat exchanger thereafter. The heat exchanger also preferably comprises means for gaining access to the drain water compartment for cleaning purposes and may include integral, moveable brush means for cleaning the drain water compartment. A preferred construction for the heat exchanger comprises at least two vertically stacked cold water flow through compartments and at least two vertically stacked drain water flow through compartments separated by a single sheet of heat conducting material and located in the base of the shower enclosure. Countercurrent flow heat exchangers having an effectiveness (E) of at least about 0.5 and at least about 10 square feet of heat exchange surface are preferred. Best results are obtained with the apparatus of the invention when the bathing enclosure includes means for preventing escape of water vapor.

The local heater preferably comprises an electric heater including a power switch actuated in response to the flow of water through the flow path. It is also advantageous if the heater further comprises temperature sensing means in thermal communication with water upstream of the heating element and means responsive to the temperature sensing means for controlling the thermal output of the heater element. It is contemplated, although not required, that the heater have sufficient capacity to boil water passing through the flow path.

In one aspect, the invention as described above comprises a shower enclosure with its conventional components together with the components described above wherein the combination of all components cooperate as disclosed to attain significant energy savings. In another aspect the invention comprises a heat exchanger and local heater in combination which may be used to retrofit conventional shower bathing equipment either at the time of installation or thereafter.

Accordingly, objects of the invention include the provision of a method and apparatus for reducing energy consumption in shower bathing and the provision of a novel heat exchanger for preheating incoming cold water with drain water used in shower bathing. Another object of the invention is to provide a heat exchanger for use with a shower bathing apparatus which may be easily cleaned.

Other objects and features of the invention will be apparent from the following description of some preferred embodiments and from the drawing.

BRIEF DESCRIPTION OF THE DRAWING

Like reference characters in the respective drawn figures indicate corresponding parts.

DESCRIPTION OF THE PREFERRED EMBODIMENT

Figure 1:
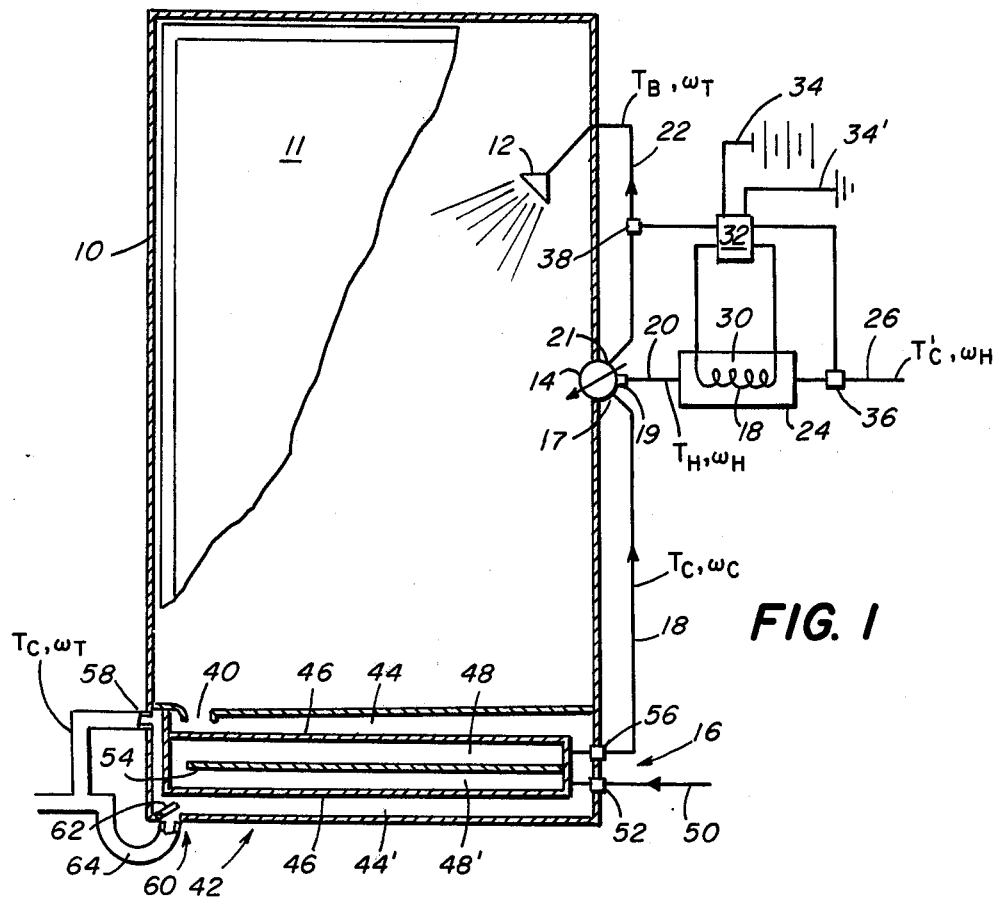
FIG. 1 is a diagram schematically illustrating the invention.

Referring to the drawing, FIG. 1 illustrates a shower bathing enclosure 10 which features an enclosure door 11, a shower nozzle 12, a mixing valve 14 operable from within the enclosure 10, and a base 16. The mixing valve 14 includes a cold water inlet 17 fed by conduit 18, a hot water inlet 19 fed by hot water conduit 20, and a bath water output 21 leading to bath water conduit 22 which feeds nozzle 12. The mixing valve 14 may be of the common, manually controlled variety. However, in this case it should include a failsafe mechanism which precludes the possibility that hot water only exits nozzle 12. Preferably, the mixing valve is thermostatically controlled. This allows the water exiting nozzle 12 to be maintained at a desired temperature throughout the duration of the shower. Such valves are commercially available.

A hot water heater 24 disposed adjacent enclosure 10 is fed by inlet conduit 26 and delivers hot water through conduit 20 to the mixing valve 14. As illustrated, the heater comprises a heating element 18 disposed within a feed water flow path 30. Control means 32 is serviced by power lines 34, 34'. The control 32 is switched to its operative mode by means 36 for sensing the flow of water through feed line 26 and flow path 30. Alternatively, a manually operated switch or a switch actuated by the mixing valve could be used. A temperature sensing means 38, located in thermal communication with the water flowing through the mixing valve's output conduit 22 (or alternatively in communication with the water flowing through the hot water inlet line 20, not shown), provides a signal to control 32 which is used to modulate the thermal output of heating element 18 in a manner well known to those skilled in the art. If a thermostatically controlled mixing valve is used, sensor 38 may be omitted. The heater is designed to have a capacity such that it can continuously and instantaneously heat water flowing through flow path 30 from its source temperature to at least about 170° F.

A drain 40 located in the base of enclosure 10 leads to a heat exchanger generally designated at 42. The heat exchanger comprises a pair of drain water flow-through compartments 44, 44' separated by a heat conducting material 46 from a pair of cold water flow-through compartments 48, 48'. Cold water enters the heat exchanger 42 from feed line 50 and cold water inlet 52, passes through compartments 48' and 48, diverted by baffle 54, and after absorbing heat from drain water passing through compartments 44, 44', exits via output 56 and passes through line 18 to the mixing valve 14.

Heat exchanger 42 features two drain water outlets shown at 58 and 60. Outlet 60 includes means 62 for diverting exiting drain water flow through a selected one of the outlets 58, 60. With diverting means 62 in the closed position to seal outlet 60, it will be apparent from the drawing that drain water fills both compartments 44 and 44' and exits via outlet 58. When diverting means 62 is open (as shown) all drain water contained in heat exchanger 42 exits via the trap 64.

In operation, at the outset, diverting means 62 is closed, and mixing valve 14 is opened. Cold water at temperature $T'_c$ (or preferably hot water from a central boiler) at a flow rate $\omega_H$ enters heater 24 which is actuated by switch 36 in response to the flow of water. As the water passes about heating element 18 in flow path 30 it is "instantaneously" heated to the temperature $T_H$, which is at least about 170° F., and immediately fed to the mixing valve 14 via conduit 20. Simultaneously, cold water at temperature $T'_c$ and flow rate $\omega_c$ enters the heat exchanger 42 via line 50 and inlet 52, passes through cold water compartments 48' and 48, and is delivered to the mixing valve 14 via conduit 18. In the mixing valve, the hot and cold water are mixed together to result in a stream of water exiting the nozzle 12 at temperature $T_B$ and flow rate $\omega_T$. This water initially loses some heat to the shower enclosure by evaporative cooling. When the enclosed space of the bathing enclosure reaches 100% relative humidity, this evaporation stops. The water fills drain water compartments 44 and 44'. Thereafter, the incoming cold water at temperature $T'_c$ absorbs heat in heat exchanger 42 from the drain water. Thus, the drain water is reduced in temperature to $T_E$ and the incoming cold water is warmed to temperature $T_c$ before it is delivered to the mixing valve 14.

It is contemplated that a thermostatically controlled mixing valve may be used. In this case, the shower bath initially will draw more hot water from heater 30 than when the unit is running in its steady-state condition. To keep the bath temperature constant during the startup interval, a gradual increase in cold water flow and reduction of hot water flow is required. This could be done manually, but a thermostatically controlled mixing valve is preferred. Alternatively, the unit could be designed to provide the mixing valve with a constant flow of hot water equal to that needed during steady-state operation, and the bather could simply wait for the shower bath water to come to temperature.

In the discussion which follows, heat loss from the heat exchanger itself is neglected because this source of inefficiency can be virtually eliminated through routine engineering practices. Also, it is assumed that no further heat is lost from the bath water by evaporation within the shower enclosure, i.e., the interior of the bathing enclosure has reached 100% relative humidity and no heat is lost through the enclosure itself. In order to minimize heat loss, insulation should be placed within the enclosure walls, and the enclosure should be fitted with a door 11 having a vapor barrier seal (not shown). Failure to take these precautions will reduce but not destroy the energy efficiency characteristic of the invention.

According to these assumptions, all of the energy that is given up by the exiting drain stream appears in the preheated cold water stream, which is increased in temperature from $T'_c$ to $T_c$. The energy balance of the flows indicated in FIG. 1, as a consequence of the assumption above and the first law of thermodynamics, requires that $$\omega_H \cdot C_p \cdot T_H + \omega_c \cdot C_p \cdot T_c = (\omega_H + \omega_c) \cdot C_p T_B \quad (1)$$

where $C_p$ is the heat capacity of water and the other variables have the meaning indicated above. From equation 1 it may be observed that if all of the sensible heat of the drain stream could be extracted from that stream and transferred into the cold water stream so that the cold water stream were preheated to the desired bath temperature ($T_B$) then no additional energy would be required to heat hot water for bathing and the mass flow rates of the cold water and drain streams would be the same ($\omega_c = \omega_T$). However, in any practical attempt to use the system illustrated in FIG. 1, some additional hot water will be required. Therefore, the mass flow rate of the drain stream will exceed the mass flow rate of the cold water supply ($\omega_T \geq \omega_c$). In this case the heat transfer from the warm drain water to the cold water supply can more readily be made to heat the cold water to a temperature which approaches that of the bath ($T_B$). For this case, the performance of the heat exchanger, which is critical to the performance of the system shown in FIG. 1, can be represented by a "temperature effectiveness" (E) as follows:

$$E = \frac{T_c - T'_c}{T_B - T'_c} \quad (2)$$

By using this quantity, one can write the expression for the total energy ($En_{total}$) required to heat hot water for bathing in this system as follows:

$$En_{total} = C_p \omega_H (T_H - T'_c) = \frac{C_p \omega_T (1 - E)}{\left(\frac{1}{T_B - T'_c}\right) - \left(\frac{E}{T_H - T'_c}\right)} \quad (3)$$

By using conventional engineering techniques, it is possible to design a heat exchanger to operate at essentially any level of effectiveness (E) from 0.0 to very close to 1.0. Well designed heat exchangers commonly operate with an effectiveness of approximately 0.5; some heat exchangers used in exacting applications operate with an effectiveness of 0.8 to 0.9.

The amount of energy required for shower bathing with the system of FIG. 1 is determined by the temperature ($T'_c$) at which cold water is supplied, the selected temperature of the bath ($T_B$), the temperature to which hot water is heated ($T_H$) and the effectiveness of the heat exchanger (E) as shown by the expression set forth above (Equation 3). The following data indicate the effect of using the system of FIG. 1 for shower bathing.

In the tables which follows, the expression "$En_{tot}/En_{tot(E=0)}$" is the ratio of the energy required to provide the same bath water temperature in the system of FIG. 1 to the energy required by a conventional system with no heat exchanger. All temperature data are in degrees Fahrenheit.

| CASE 1 | E | $En_{tot}/En_{tot(E=0)}$ |
|---|---|---|
| $T'_c = 40°$ | 0.0 | 1.0 |
| $T_B = 100°$ | 0.5 | 0.75 |
| $T_H = 130°$ | 0.6 | 0.67 |
| | 0.7 | 0.56 |
| | 0.8 | 0.43 |
| | 0.9 | 0.25 |
| | 1.0 | 0.0 |

| CASE 2 | E | $En_{tot}/En_{tot(E=0)}$ |
|---|---|---|
| $T'_c = 40°$ | 0.0 | 1.0 |
| $T_B = 100°$ | 0.5 | 0.61 |
| $T_H = 200°$ | 0.6 | 0.52 |
| | 0.7 | 0.41 |
| | 0.8 | 0.29 |
| | 0.9 | 0.151 |
| | 1.0 | 0.0 |

| CASE 3 | E | $En_{tot}/En_{tot(E=0)}$ |
|---|---|---|
| $T'_c = 40°$ | 0 | 1.0 |
| $T_B = 110°$ | 0.5 | 0.64 |
| $T_H = 200°$ | 0.6 | 0.54 |
| | 0.7 | 0.43 |
| | 0.8 | 0.30 |
| | 0.9 | 0.16 |
| | 1.0 | 0.0 |

| CASE 4 | E | $En_{tot}/En_{tot(E=0)}$ |
|---|---|---|
| $T'_c = 40°$ | 0 | 1.0 |
| $T_B = 100°$ | 0.5 | 0.607 |
| $T_H = 210°$ | 0.6 | 0.507 |
| | 0.7 | 0.398 |
| | 0.8 | 0.278 |
| | 0.9 | 0.1465 |
| | 1.0 | 0.0 |

From the foregoing tables it is apparent that with a heat exchanger of moderately good performance (E=0.5 to 0.7), it is possible to reduce the energy required for shower bathing by 40 to 50 percent. It is also apparent that the savings of energy by use of the system of FIG. 1 increases as the temperature ($T_H$) to which the hot water is heated increases. For example, with hot water heated to 130° F. to provide a bath temperature of 100° F., and with a heat exchanger having an effectiveness of 0.6, the system of the drawing requires two-thirds as much energy as a conventional shower bath system. If the temperature of the hot water stream is increased to 210° F., under the same conditions, the system requires only 50 percent as much energy as the conventional system. This of course represents a savings of approximately 32 percent of the energy required for shower baths by the already improved system of the drawing operating under the conditions of Case 1.

That heating water to higher temperatures can save energy may appear to contradict intuition. However, the conventional understanding of the use of energy for hot water heating and bathing is based upon use of the conventional system involving no heat exchanger. In such a conventional system the amount of energy contained in the bath stream is not influenced by the temperature ($T_H$) to which the hot water is heated. Furthermore, as the temperature of the hot water delivered from a central boiler is increased, the losses of heat from the heater tank and from the hot water delivery lines increases.

However, the system of the drawing functions quite differently. The system functions (approximately) as if the cold water and the hot water were drawn from different sources. Cold water is received at the mixing valve at the temperature $T_c$. It is at a higher temperature than the cold water ($T'_c$) which is fed to the hot water heater. As the temperature ($T_H$) at which hot water is delivered to the mixing valve is increased, less hot water is required to heat the bath to the desired temperature. The decrease in the flow of hot water now appears as an increase in the flow of cold water to the mixing valve at the temperature $T_c$. The energy required to heat a mixture of two streams, one at $T_H$ and the other at $T_c$, so that the streams blend to produce a bath temperature of $T_B$ is of course the same irrespective of the temperature to which the hot water stream is heated. However, in the case of the system of the invention, additional flow of the cold water stream is accompanied by additional recovery of energy from the drain stream, and this represents, indirectly, additional recovery of the energy of the hot water itself.

This situation is to be compared with the case in which no heat exchanger is used, and all the cold water arrives at the mixing valve at temperature $T'_c$ rather than the preheated temperature $T_c$. The apparatus of the invention, by permitting one to draw progressively more cold water from the apparently warmer (at $T_c$) reservoir of "cold" water as one increases the temperature to which the hot water is heated, also permits one to use progressively less energy than would be required by a conventional system.

This aspect of the operation of the heat exchanger—local heater combination of the invention leads to several interesting possibilities. First, note that with a hot water supply temperature of 210° F. (Case 4) and with a heat exchanger of 0.7 effectiveness, the system requires only 40 percent of the energy required by a conventional system. This represents a substantial potential saving of energy. In addition, the flow of hot water can be sharply reduced from that required by a conventional system. In such a conventional system in which $T_H$ approximates 130° F. and $T_c$ is equal to about 40° F., the total energy required for operation at a bath temperature of 100° F. will be the same as that of the novel system in Case 4 when the heat exchanger of the novel system does not work (E=0). It thus can be calculated that the flow of hot water in the system of the invention is reduced to about 20 percent of that required by a conventional system, and the power required for heating the water is reduced to about 40 percent of that consumed by a conventional system. Thus, there are advantages to be obtained if a small water heater is installed directly in the hot water line to instantaneously heat the hot water as it is required. This permits one to dispense with that portion of the capacity of a central boiler used for bath water heating and to eliminate the hot water transmission line heat losses. Thus, the system of the invention offers the opportunity to build shower bathing units in a unitized form which incorporates the hot water heater and a heat exchanger as well as the bathing unit itself.

It has been recognized that energy losses from hot water transmission lines and storage tanks can be eliminated by the use of a local hot water heater. However, while this approach increases the thermal efficiency of water heating it normally has the disadvantage of placing a large and typically costly demand for energy on the energy supply system. For example, in a conventional shower bath in which the total flow rate of water is 20 pounds per minute (approximately 2.4 gallons per minute) where cold water is received at 40° F. ($T'_c$) and the bath temperature ($T_B$) is 100° F., the total power required would be:

$$\omega C_p(T_B - T'_c) \cong 1200 \text{ BTU/min}$$

1200 BTU/min equates approximately to 21 kw. This power demand represents a line current of about 88 ampere at 240 volts and would be approximately twenty times the average demand for power by a residence. Accordingly, it would be likely to bring the user of such a device additional high charges for imposing excess demands on the utility system.

However, by using the novel system of FIG. 1, under the conditions, for example, of Case 4 noted above, it is possible to reduce the demand for power required for instantaneous water heating to approximately 8.4 kw (for E=0.7) when used in combination with a heat exchanger. By using a heat exchanger of even higher performance, for example, E=0.85, one can reduce the demand for power to approximately 4.5 kw. These levels of demand are within the range that utility systems can deliver to individual consumers.

In the cases set forth in the tables above, the highest hot water temperature is in Case 4 (210° F.). It may be very useful to supply sufficient capacity to the hot water heater so that it can be used as a boiler. The heater could then deliver saturated steam at 212° F. and approximately one atmosphere pressure to the mixing valve and shower head. Thus, the energy which the hot water stream could carry into the shower bath would be dramatically increased. In fact, such an arrangement would have the same effect as if the hot water had been heated as a liquid under pressure to a very high temperature prior to being mixed in the valve. There would be no purpose in doing this in a conventional bath system as it would only impose excessive power demand, but in a novel system shown in FIG. 1, such an approach can offer additional savings of energy and power. In a system where the heater is operated as a boiler, the system would behave as if the hot water stream had been heated to 1000° F.+(the latent heat of vaporization/condensation of steam is approximately 975 BTUs/pound). Thus, the ratio of the energies required by the system of FIG. 1 and the conventional system ($En_E/En_{E=0}$) is given approximately by:

$$En_E/En_{E=0} = \frac{\omega_T C_p(1-E)(T_B - T'_c)}{\omega_T C_p(T_B - T'_c)},$$

or $$En_E/En_{E=0} = (1-E).$$

Thus, with a heat exchanger of 70 percent effectiveness, the energy required for bathing would be 30 percent of that required with a conventional system. For a shower bath operating with a total flow ($\omega_T$) equal to 20 pounds per minute, a bath water temperature ($T_B$) of 100° F., and a cold water source ($T'_c$) at 40° F., the power required for instantaneous local hot water heating would be 6.3 kw. If a heat exchanger having an effectiveness of 0.85 were used, the power required would be 3.2 kw. These magnitudes of power are within the range in which the use of instantaneous local heating of hot water to very high temperature, or boiling, may be practical.

Figure 2:
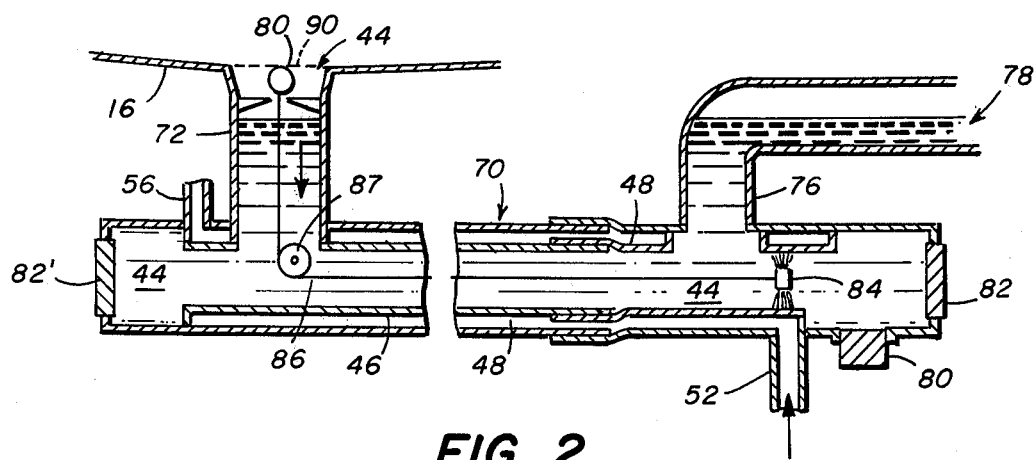
FIG. 2 is a schematic diagram of a coaxial type counterflow heat exchanger useful in the apparatus of the invention.

The heat exchanger used in the invention should be placed below the level of the drain in the base of the shower enclosure. It should also be designed so as to permit easy cleaning. One possible type of heat exchanger that may be used in the system of the invention is shown in FIG. 2. It comprises an elongate trap 70 fed with drain water from drain pipe 72. Drain water fills the compartment in the trap indicated at 44 and exits via the riser pipe 76 having an outlet 78 at or slightly below the level of the drain 40 in the base 16 of the shower enclosure. This construction allows hot drain water to completely fill compartment 44. Cold water is fed to the heat exchanger via inlet 52, fills annular compartment 48 separated from drain water compartment 44 by heat conducting material 46, and exits in a preheated condition through outlet 56. As shown, the heat exchanger features removable plugs 82, 82', and 80 which allow access to the heat exchange surfaces for periodic thorough cleaning. For regular maintenance of the heat exchange surfaces, a brush 84 is mounted for reciprocal movement within compartment 44. The brush 84 is attached to a flexible shaft 86 journaled about wheel 87 and attached to a ring 80. If the drain screen 90 is removed, brush 84 may be reciprocated within compartment 44 by pushing and pulling on ring 80.

Figure 3:
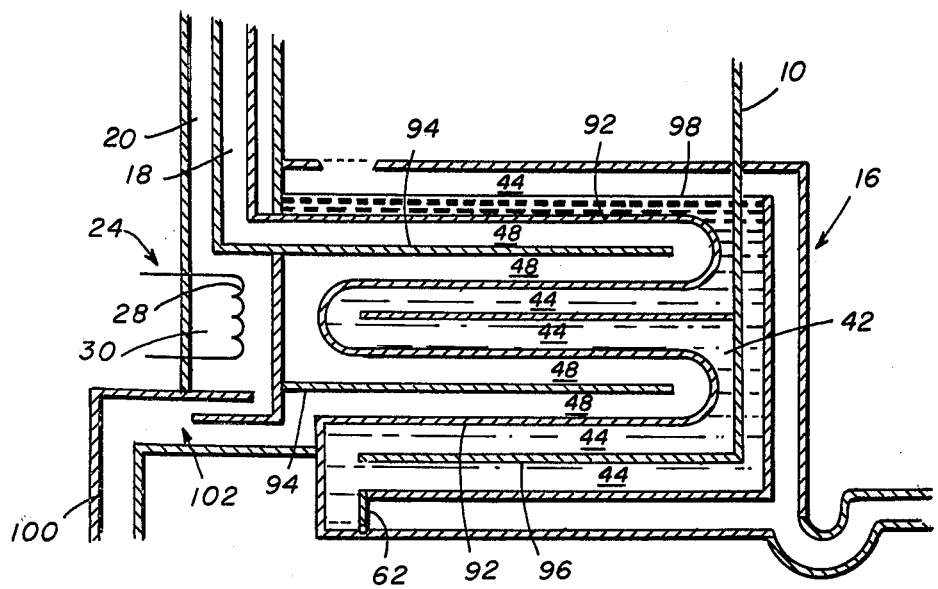
FIG. 3 is a schematic, cross-sectional, partially broken away view of an important embodiment of the heat exchanger of the invention shown installed in the base of a shower bath enclosure.
Figure 4:
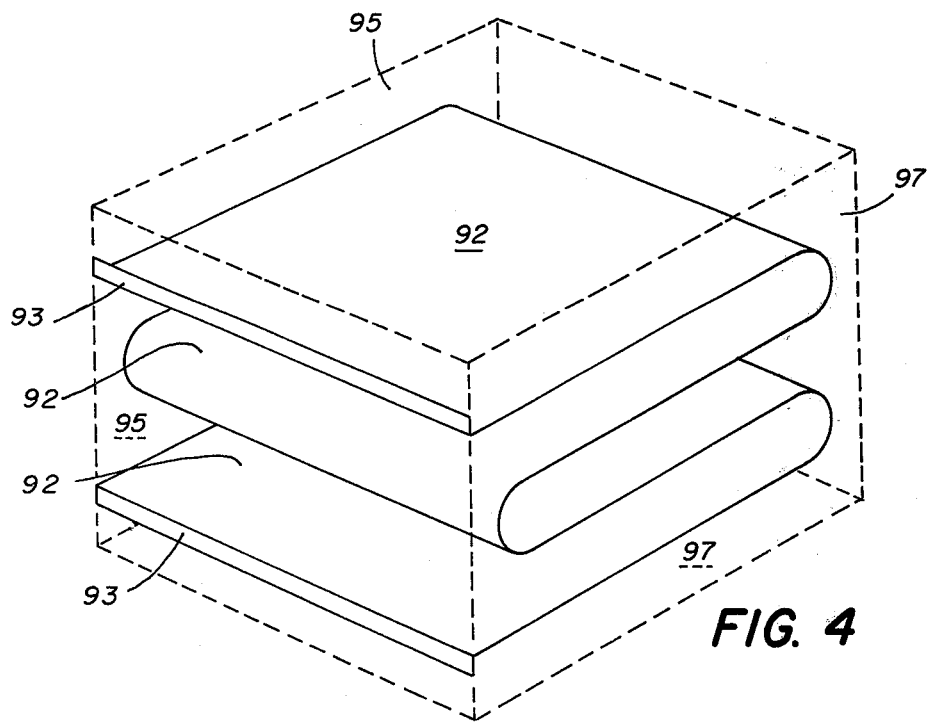
FIG. 4 is a perspective view of the heat exchange surface of the heat exchanger of FIG. 3.

FIGS. 3 and 4 show still another possible embodiment of a heat exchanger suitable for use with the invention. In this case, the heat exchanger is built directly into the base of the shower cabinet (or tub). The exchanger is made of folded sheet metal material 92 into which baffles 94, 96 have been inserted to guide the water flow. With this type of construction the baffles are attached as cantilevers on the vertical walls of the base of the bathing cabinet and may be supported by lightweight parts of inert material, e.g., glass rods, (not shown) near their ends. The ends 93 of the folded metal sheet 92 which defines the drain water and cold water compartments, 44 and 48, respectively, may, for example, be welded or soldered in position and may be sealed to a plate 95 (shown in phantom in FIG. 4). Compressible material (polymer, rubber, etc.) can be applied in advance of assembly to the edges of the baffles 96 and sheet 92 to seal the edges against the flow of cold water and thus to insure that cold water follows the path desired. Access to the interior of the heat exchanger for cleaning purposes would be gained by including a removable plate 97 at the front of the base of the shower enclosure which would allow access to all heat exchange surfaces. The method of construction described here is intended to be exemplary and to show that the proposed heat exchanger can be assembled without difficulty. Other techniques of assembly can also be used.

The heat exchanger of FIG. 3 includes means for diverting the drain water (shown at 62) to a selected one of two drain water exits. With the baffle 62 in the closed position as shown, drain water will fill the heat exchanger to the level indicated by line 98. When, after operation of the shower bath, the baffle 62 is open to the position shown in phantom in FIG. 3, the heat exchanger may be emptied of drain water.

The embodiment of the invention shown in FIG. 3 also includes an integral local hot water heater 24 having a flow through feed water compartment 30 and a heating element 28 as previously described. A single source of water fed into inlet 100 may be used in this case. Thus, incoming water would be broken up at 102 into a pair of streams; one of relatively low volume which is directed to the heater 24, and; a second of higher volume which is directed through the feed water side 48 of the heat exchanger 42. In a manner similar to that described with reference to FIG. 1, preheated "cold" water is delivered to the mixing valve (not shown) via conduit 18. Hot water boosted in temperature (if the heater is fed from a central boiler) or heated from the cold water temperature (if a single water inlet is used) is delivered to the mixing valve via conduit 20.

The heat exchanger (with or without the integral heater 24) shown in FIG. 3 comprises a currently preferred form for use in the invention because it offers a most promising approach to providing a heat exchanger having a cost and an effectiveness which can maximize the energy saving described above and minimize the initial capital investment in the unit. Using commonly available heat exchange design principles, it can be calculated that if the distance between baffles 94, 96 and the heat exchange surfaces defined by sheet 92 were $\frac{1}{4}$ inch and a bath temperature of 130° F. were selected, then to achieve a heat exchanger effectiveness 0.8, 12.5 square feet of heat exchange surface area would be needed. This analysis assumes that the ratio of cold water flow to drain water flow, moving countercurrently, is 0.85, that sheet 92 is copper 0.02 inch thick, and that the bath water flow rate is 2.5 gal/min. or 1,248 lb./hr. If the temperature of the bath were 170° F. and the ratio of the minimum to maximum flow 0.7, then under the same conditions, 11 square feet of heat exchange surface area would be needed.

A typical shower base is 32"×36". If the sheets were 32 inches wide and the folds were 36 inches long, each fold (doubled over) would provide 16 square feet of surface for heat transfer. Thus, for the cases just considered, only one fold would be necessary. The heat exchanger would define two stacked cold water compartments and two stacked drain water compartments, and these would function with an effectiveness of greater than 80 percent. Even when a sheet material 92 having somewhat inferior heat exchange properties as compared with copper is used, it can be calculated that the total height for such a heat exchanger would be no greater than about six inches. It is thus possible to build such an exchanger directly in the shower or tub base as an integral package without making the unit unduly or unconventionally high.

From the foregoing it will be apparent that significant departure can be made from the exemplary teaching directed to specific embodiments of the invention disclosed herein without departing from the spirit and scope thereof. For example, specific design features of the heat exchanger except as set forth in the claims which follow, are not considered to constitute inventive subject matter and will be well within the skill of those in the art. Accordingly, other embodiments are within the following claims.

What is claimed is:

1. An apparatus for bathing comprising a bathing enclosure having a base, a nozzle for passing bathing water through said enclosure, a mixing valve having a hot water inlet, cold water inlet, and bathing water outlet in communication with said nozzle, and a drain in said base, wherein the improvement comprises
   a heat exchanger having
      a flow-through drain water compartment in communication with said drain, a drain water outlet below said drain and above at least a substantial portion of the volume of said drain water flow-through compartment, and a flow-through cold water compartment in communication with the cold water inlet of said mixing valve, said heat exchanger being operable to cool the drain water and to heat the cold water passing therethrough.

2. The apparatus of claim 1 further comprising a hot water heater adjacent said enclosure and in communication with said hot water input, said heater comprising a heating element disposed within means defining a feed water flow path, said heater being capable of continuously providing water at a temperature of at least about 170° F. to said mixing valve whereby the ratio of hot water to cold water entering said mixing valve to attain a selected bath water temperature is no greater than 1.0.

3. The apparatus of claim 1 or 2 wherein the drain water outlet of said heat exchanger is located above the level of said drain water compartment, said heat exchanger further comprising a second drain water outlet located below said drain water compartment and means for diverting drain water flow to a selected one of said drain water outlets.

4. The apparatus of claim 1 or 2 wherein said heat exchanger further comprises means for gaining access to said drain water compartment for cleaning purposes.

5. The apparatus of claim 1 or 2 wherein said heat exchanger further comprises integral moveable brush means for cleaning said drain water compartment.

6. The apparatus of claim 1 or 2 wherein said heat exchanger is located within said base and comprises at least two vertically stacked cold water flow-through compartments and at least two vertically stacked drain water flow-through compartments, said drain water and cold water compartments being separated by a single sheet of heat conducting material.

7. The apparatus of claim 1 or 2 wherein said heat exchanger is a countercurrent flow heat exchanger having an effectiveness (E) of at least about 0.5.

8. The apparatus of claim 1 or 2 wherein said bathing enclosure includes means for preventing escape of water vapor therefrom including a door with a vapor seal.

9. The apparatus of claim 1 or 2 wherein each said compartment has at least 10 ft.$^2$ of heat exchange surface.

10. The apparatus of claim 2 wherein said heater is an electric heater and includes a power switch which is opened in response to the flow of water through said flow path.

11. The apparatus of claim 2 wherein said heater further comprises temperature sensing means in thermal communication with water upstream of said heating element and means responsive to the temperature sensing means for controlling the thermal output of said heating element.

12. The apparatus of claim 2 wherein said heater has a thermal output sufficient to boil water passing through said flow path.

13. The apparatus of claim 2 wherein said mixing valve comprises a thermostatically controlled mixing valve.

14. An energy conserving apparatus for use with a shower bath having a mixing valve and a drain, said apparatus comprising, in combination:

a countercurrent flow heat exchanger having a fresh water inlet, a fresh water flow-through compartment, and a fresh water outlet for connection with a cold water inlet in the mixing valve, a drain water inlet for connection with the drain, a drain water flow-through compartment in heat exchange relation with said fresh water compartment, a drain water outlet disposed above at least a substantial portion of the volume of said drain water compartment, and means for gaining access to said drain water compartment for cleaning purposes; and a hot water heater comprising a heating element disposed within means defining a feed water flow path having a feed water inlet and a hot water outlet for connection with a hot water inlet in the mixing valve, said heater being capable of continuously providing water at a temperature of at least about 170° F. to said mixing valve whereby the ratio of hot water to cold water entering said mixing valve to attain a selected bath water temperature is no greater than 1.0.

15. The apparatus of claim 14 wherein said fresh water inlet and said feed water inlet comprise a single inlet, said apparatus further including means for diverting a first fraction of an incoming water stream to said fresh water flow-through compartment and a second fraction of said incoming water stream to said feed water flow path.

16. The apparatus of claim 14 wherein said heat exchanger comprises a second drain water outlet disposed below said drain water compartment and means for diverting drain water flow to a selected one of said drain water outlets.

17. The apparatus of claim 14 wherein said heat exchanger comprises at least two vertically stacked fresh water flow-through compartments and at least two vertically stacked drain water flow-through compartments, said drain water and fresh water compartments being separated by a single sheet of heat conducting material.

18. The apparatus of claim 14 wherein said heat exchanger has an effectiveness (E) of at least about 0.5.

19. The apparatus of claim 14 wherein each said compartment has at least 10 ft.$^2$ of heat exchange surface.

20. The apparatus of claim 14 wherein said heater is an electric heater and includes a power switch which is opened in response to the flow of water through said flow path.

21. The apparatus of claim 14 wherein said heater further comprises temperature sensing means in thermal communication with water upstream of said heating element and means responsive to the temperature sensed by said temperature sensing means for controlling the thermal output of said heating element.

22. An apparatus for bathing comprising a bathing enclosure having a base, a nozzle for passing bathing water through said enclosure, a mixing valve having a hot water inlet, cold water inlet, and bathing water outlet in communication with said nozzle, and a drain in said base, wherein the improvement comprises, in combination:

a heat exchanger having a flow-through drain water compartment in communication with said drain and a flow-through cold water compartment in communication with the cold water inlet of said mixing valve, said compartments being separated by a heat conducting material; and a hot water heater in communication with said hot water input, said heater comprising a heating element disposed within means defining a feed water flow path, said heater being capable of continuously providing water at a temperature of at least about 170° F. to said mixing valve whereby the ratio of hot water to cold water entering said mixing valve to attain a selected bath water temperature is no greater than 1.0.

* * * * *